United States Patent [19]

Davies et al.

[11] Patent Number: 5,524,681

[45] Date of Patent: Jun. 11, 1996

[54] APPARATUS AND METHOD FOR DRAINING AND FILLING A BATTERY COOLING SYSTEM

[75] Inventors: Timothy J. Davies, Farmington Hills; Craig A. Kovarik, Dearborn, both of Mich.

[73] Assignee: Ford Motor Company, Dearborn, Mich.

[21] Appl. No.: 325,728

[22] Filed: Oct. 19, 1994

[51] Int. Cl.$^6$ ........................................ B08B 9/00
[52] U.S. Cl. ........................... 141/92; 141/7; 141/65; 141/67; 165/95; 134/169 A; 429/26; 429/62; 429/120; 123/41.14
[58] Field of Search ..................... 141/5, 7, 65, 67, 141/91, 92, 98; 429/26, 62, 120; 165/95; 123/41.14; 134/169 A

[56] References Cited

U.S. PATENT DOCUMENTS

| | | | |
|---|---|---|---|
| 2,187,413 | 1/1940 | Boczi et al. | 165/95 X |
| 3,726,262 | 4/1973 | Moon | 123/41.1 |
| 3,848,181 | 11/1974 | Hebert, Jr. et al. | |
| 3,939,901 | 2/1976 | Cieszko et al. | 165/1 |
| 3,989,103 | 11/1976 | Cieszko et al. | 165/110 |
| 4,007,315 | 2/1977 | Brinkmann et al. | 429/62 |
| 4,213,474 | 7/1980 | Harrison | 134/169 A X |
| 4,377,786 | 3/1983 | Paul et al. | |
| 4,390,049 | 6/1983 | Albertson | 141/92 |
| 4,791,890 | 12/1988 | Miles et al. | 123/41.14 |
| 5,078,866 | 1/1992 | Filowitz et al. | 165/95 X |
| 5,232,513 | 8/1993 | Suratt et al. | 134/169 A X |
| 5,299,606 | 4/1994 | Schrupp | 141/91 |
| 5,329,889 | 7/1994 | Caldwell | 123/41.54 |

*Primary Examiner*—J. Casimer Jacyna
*Attorney, Agent, or Firm*—Paul K. Godwin; Roger L. May

[57] ABSTRACT

An apparatus and method for filling and draining coolant from a battery cooling system (10). A coolant delivery system (94) is fluidly connected to the battery cooling system (10) for providing new coolant to the battery cooling system (10) when filling and for purging coolant from the battery cooling system (10) when draining. A pressurization system (96) is fluidly connected to the battery cooling system (10) for pressurizing the battery cooling system (10) after providing coolant when filling and for purging coolant when draining. A vacuum system (98) is fluidly connected to the coolant delivery system for creating a vacuum after draining to evacuate the battery cooling system (10) prior to filling. And, a controller (189) is electrically connected to the battery cooling system (10) to cycle a condenser fan (32) and coolant pump (26) coupled to the battery cooling system on and off according to a predetermined timing sequence.

10 Claims, 5 Drawing Sheets

APPARATUS AND METHOD FOR DRAINING AND FILLING A BATTERY COOLING SYSTEM

BACKGROUND OF THE INVENTION

The invention relates generally to battery cooling systems and more particularly to an apparatus and method for filling and draining battery cooling systems for electric vehicles.

High-energy batteries are desirable in some applications, such as in electric and hybrid vehicles, because of their superior energy capabilities. For example, sodium-sulfur (NaS) batteries are known which provide 2.5 to 4 times the specific energy of common lead-acid batteries, and 2 to 3 times the specific energy of nickel-cadmium (NICAD) batteries. The normal operating temperatures of such batteries, however, often range from 295 to 340 degrees celsius.

When current is drawn from such batteries, internal waste heat is generated. To control upper end temperatures, some high-energy batteries have cooling systems which circulate a cooling fluid through a heat exchanger internal to the battery to draw excess heat away from the battery.

Several liquid coolants have been employed in battery cooling systems. Dibenzyltoluene (known by the trade name MARLOTHERM S®) is one such coolant which is particularly suited because of its ability to perform over a wide temperature range. However, a problem associated with hydrocarbon coolants, such as dibenzyltoluene, is that such coolants readily decompose in the presence of oxygen; a reaction which is accelerated at higher temperatures. Such decomposition within the battery cooling system may reduce the rate at which excess heat can be transferred away from the battery.

A problem therefore exists in the servicing of these battery cooling systems because it has heretofore been unknown how to drain and fill coolant from such battery cooling systems without resulting oxygen contamination.

SUMMARY OF THE INVENTION

An object of the present invention is to drain and fill battery cooling systems to facilitate the servicing of such systems without resulting oxygen contamination.

The above object is achieved by providing both an apparatus and method for filling and draining battery cooling systems. In one particular aspect of the invention, the apparatus comprises: coolant delivery means fluidly connected to the battery cooling system for providing new coolant to the battery cooling system when filling the battery cooling system and for purging coolant from the battery cooling system when draining the battery cooling system; and pressurization means are fluidly connected to the battery cooling system for pressurizing the battery cooling system after providing coolant during the filling of the battery cooling system and for purging coolant during the draining of the battery cooling system.

Preferably, the apparatus further includes vacuum means fluidly connected to the coolant delivery means for creating a vacuum after the draining of the battery cooling system is complete to evacuate the battery cooling system prior to the filling of the battery cooling system. And, control means electrically connected to a condenser fan and a coolant pump coupled to the battery cooling system for controlling the condenser fan and the coolant pump according to a predetermined timing sequence during the filling and the draining.

Such an apparatus may be used to fill and drain coolant from a battery cooling system according to a method comprising the steps of: providing new coolant to the battery cooling system when filling the battery cooling system; purging coolant from the battery cooling system when draining the battery cooling system; and pressurizing the battery cooling system after the step of providing new coolant during the filling. Preferably, the method further includes the steps of cycling a condenser fan and a coolant pump coupled to the battery cooling system according to a predetermined timing sequence when filling the battery cooling system and according to another predetermined timing sequence when draining the battery cooling system. And, creating a vacuum in the battery cooling system prior to providing new coolant to evacuate the battery cooling system.

An advantage of the above aspect of the invention is that coolant may be added to or drained from the battery cooling system without resulting oxygen contamination.

BRIEF DESCRIPTION OF THE DRAWINGS

The objects and advantages described herein will be more fully understood by reading the description of the preferred embodiment with reference to the drawings wherein.

DETAILED DESCRIPTION OF THE PREFERRED EMBODIMENT

An example of an embodiment in which the invention claimed is used to advantage is described with reference to the attached figures.

BATTERY COOLING SYSTEM

Figure 1:
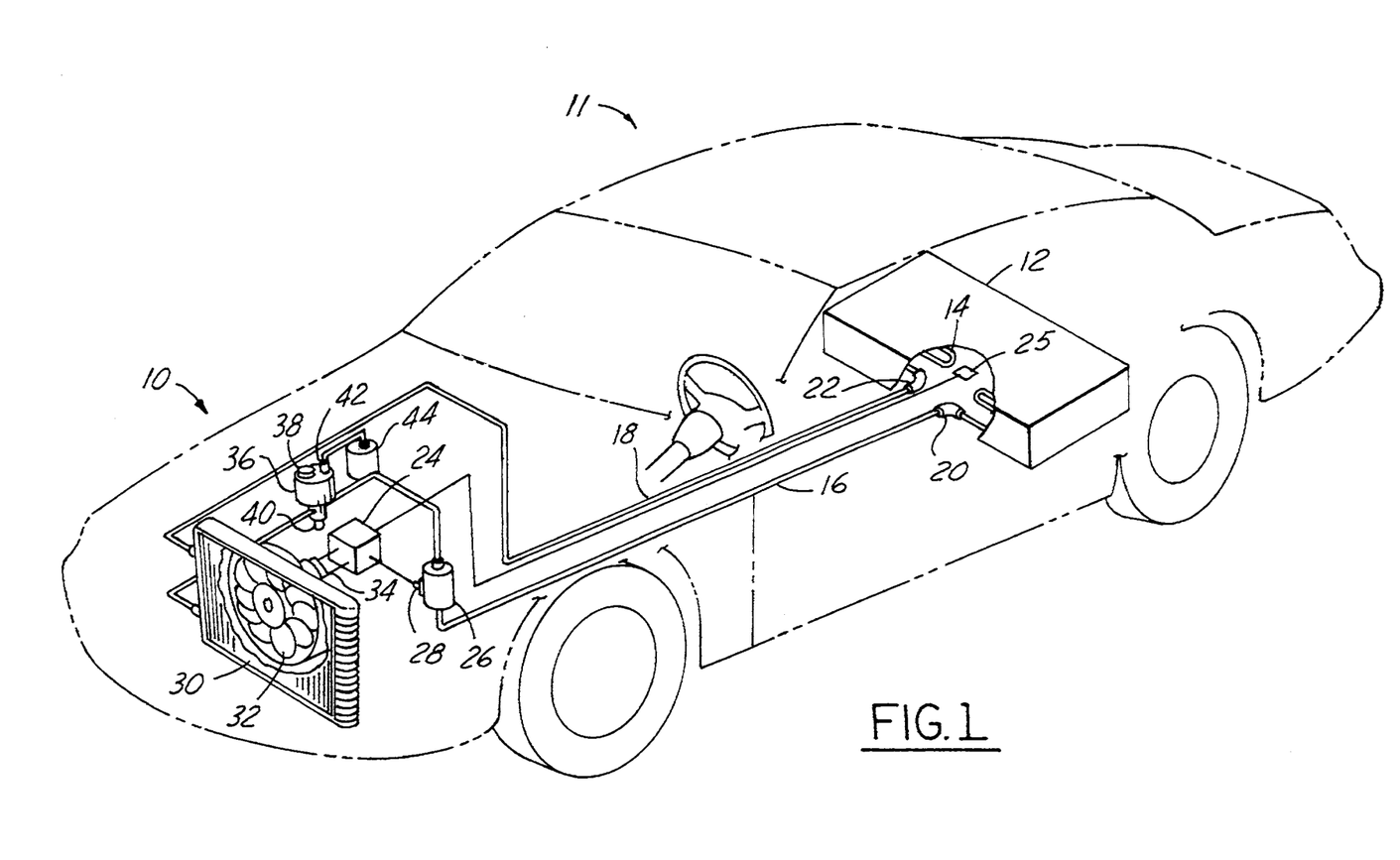
FIG. 1 is a block diagram of a battery cooling system to which the invention can be used to advantage.
Figures 2, 3, 4:
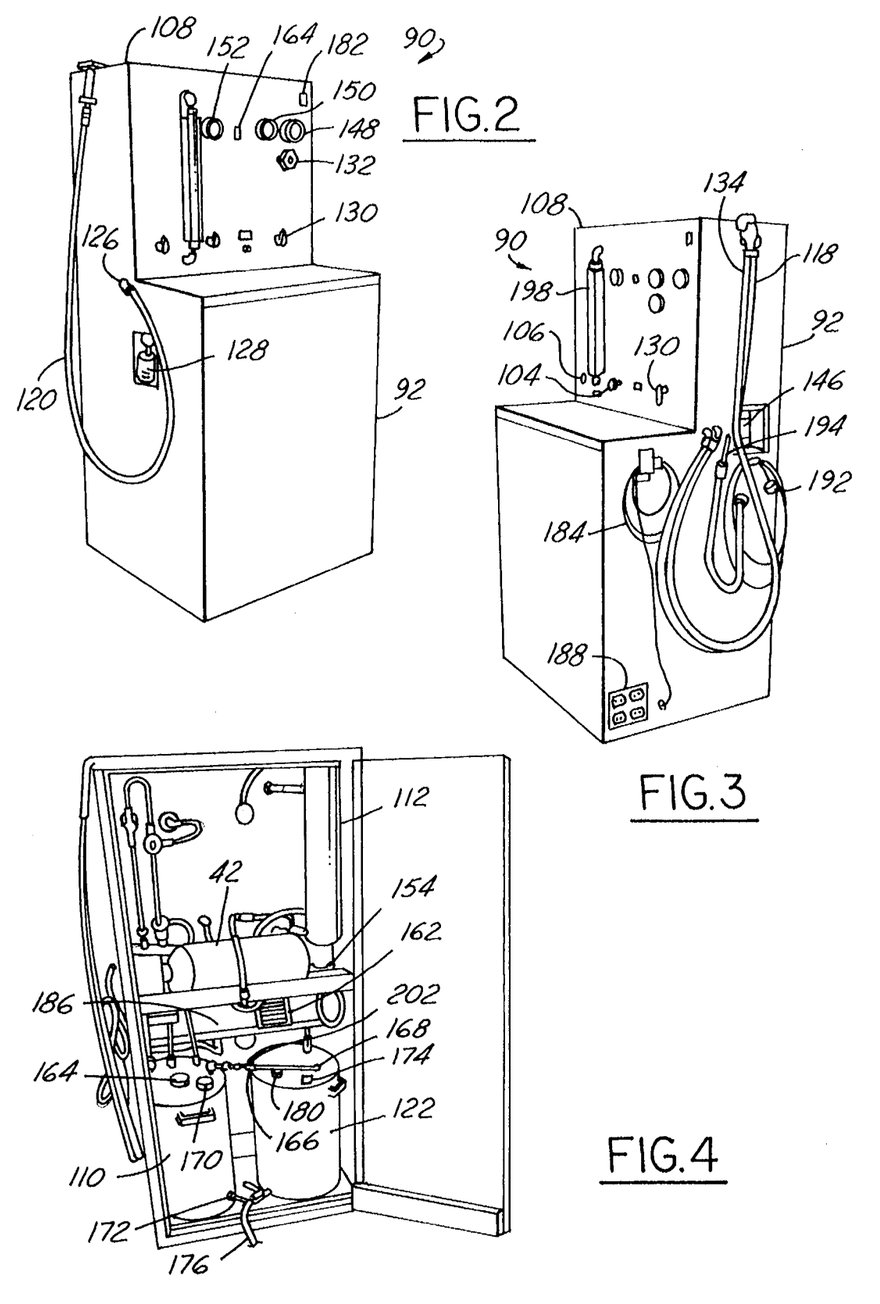
FIG. 2 is a front perspective view of an embodiment in which the invention is used to advantage.
FIG. 3 is another front perspective view of the embodiment shown in FIG. 2.
FIG. 4 is a rear perspective view of the embodiment shown in FIG. 2.
Figure 5:
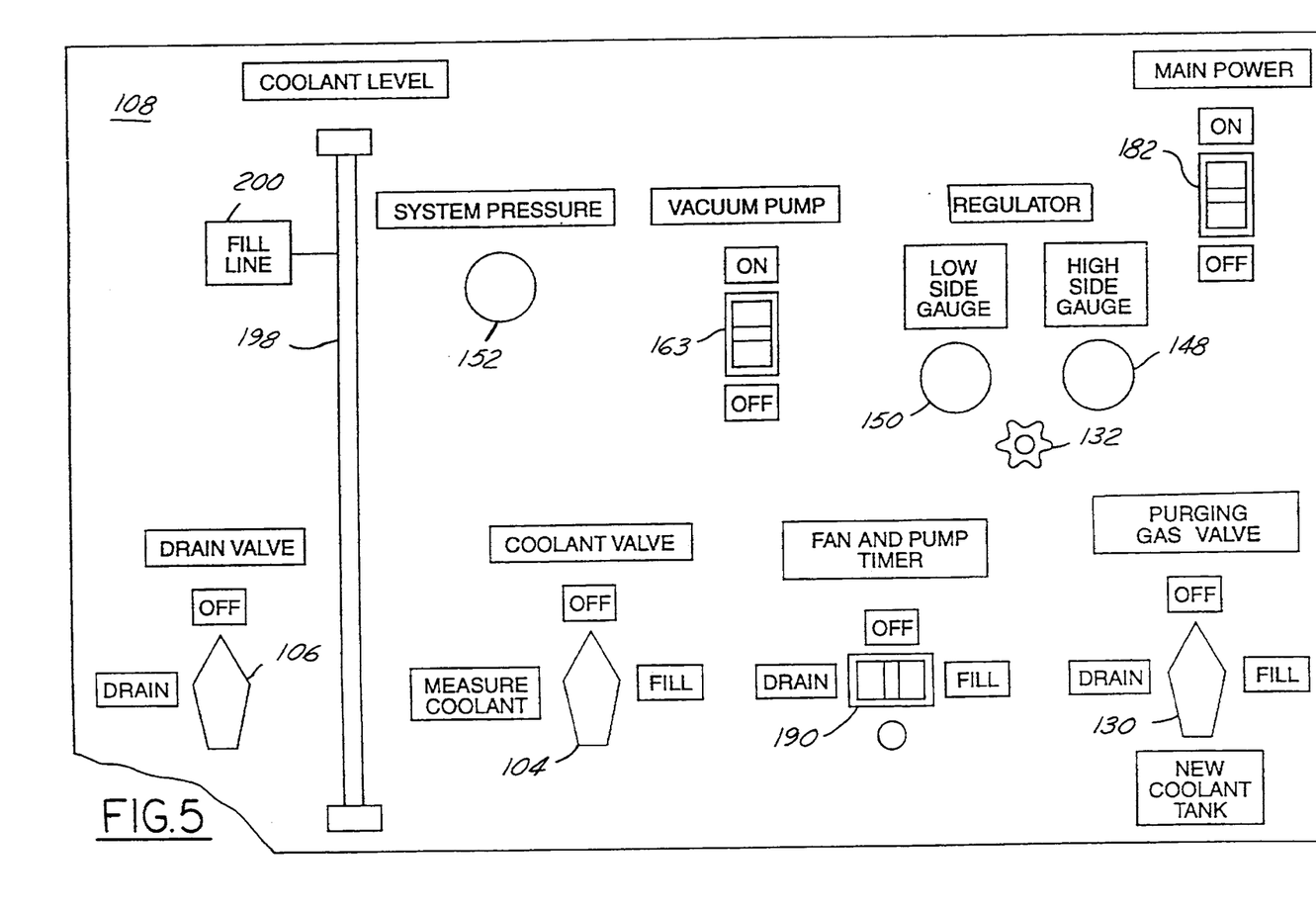
FIG. 5 is a planar view of a portion of the embodiment shown in FIG. 2.

Referring first to FIG. 1, a sealed and pressurized battery cooling system 10 is shown in a vehicle 11 wherein battery 12 is a high-energy battery that requires circulation of coolant to transfer internal heat away from the battery to maintain acceptable operating temperatures. In the system herein described, battery 12 is a sodium-sulfur (NaS) battery containing battery heat exchanger 14. Cooling lines 16 and 18 fluidly connect to heat exchanger 14 via fixtures 20 and 22. Heat exchanger 14 facilitates the circulation of liquid coolant, such as dibenzyltoluene, through battery 12 to transfer excess heat out of battery 12. While other liquid coolants may be used, dibenzyltoluene is suitable for a wide range of operating temperatures. It may experience decomposition at high temperatures (approximately 390° C.) and may experience pumping difficulties at low temperatures (approximately 10° C.).

During normal operation of battery cooling system 10, battery control module 24 monitors temperature sensor 25. In the presently described embodiment, temperature sensor 25 is a resistance temperature device (RTD) located in the battery. When battery temperature exceeds acceptable levels, battery control module 24 activates coolant pump 26 through connector 28 to circulate coolant within battery cooling system 10. High temperature coolant flows from battery 12 to battery cooler 30 which is an air-to-liquid heat exchanger. Battery control module 24 also controls condenser fan 32 through connector 34 to force air across battery cooler 30. Coolant exiting battery cooler 30 flows to expansion tank 36 which allows room for coolant to expand under high-temperature conditions. Fill port 38 and drain port 40 are located on the top and bottom of expansion tank 36, respectively. Expansion tank 36 also serves as a coolant reservoir for coolant pump 26. In the event of over expansion, relief valve 42 allows coolant to flow into coolant overflow bottle 44.

BATTERY COOLANT DRAIN AND FILL STATION

The various components of an embodiment of the invention and their interconnections will now be described with reference to FIGS. 2–7, concurrently, which show battery coolant drain and fill station 90. Four systems are housed and interconnected in cabinet 92 to facilitate draining and filling of battery cooling system 10: a coolant delivery system 94 (see FIG. 6), a pressurizing system 96 (see FIG. 6), a vacuum system 98 (see FIG. 6), and an electrical system 100 (see FIG. 7).

Coolant delivery is controlled by coolant control valve 104 and drain control valve 106 which are located in control panel 108. Coolant control valve 104 has three positions for directing flow of new coolant: MEASURE COOLANT, FILL and OFF. The MEASURE COOLANT position of coolant control valve 104 opens a path from new coolant container 110 to coolant measurement container 112 through hoses 114 and 116. The FILL position of coolant control valve 104 opens a path from measurement container 112 to coolant delivery hose 118 through hose 116. Coolant delivery hose 118 is adapted at one end to fluidly couple to fill port 38 of expansion tank 36. The OFF position of coolant control valve 104 prevents new coolant flow.

Drain control valve 106 has two positions for controlling flow of purged coolant: DRAIN and OFF. The DRAIN position of drain control valve 106 opens a path from drain hose 120 to purged coolant container 122 through hose 124. Drain hose 120 is adapted at one end to fluidly couple to drain port 40 of expansion tank 36. The OFF position of drain control valve 106 prevents the flow of purged coolant.

Coolant sampling valve 126 preferably tees off hose 124 to allow for purged coolant flow into container 128 for immediate or future evaluation when coolant sampling valve 126 is opened.

pressurization is controlled by purging gas control valve 130 located in control panel 108. Purging gas control valve 130 has four positions for directing flow of purging gas: DRAIN, FILL, NEW COOLANT and OFF. The DRAIN position of purging gas control valve 130 opens a path from regulator 132 to purging gas delivery hose 134 through hose 136. Purging gas delivery hose 134 is adapted at one end to fluidly couple to fill port 38 of expansion tank 36. The FILL position of purging gas control valve 130 opens a path from regulator 132 to coolant measurement container 112 through hoses 136 and 138. The NEW COOLANT position of purging gas control valve 130 opens a path from regulator 132 to new coolant container 110 through hoses 136 and 140. The OFF position of purging gas control valve 130 prevents the flow of purging gas.

Regulator 132 is connected to purging gas supply 142 through hose 144 and main supply valve 146. While the purging gas used in the presently described embodiment is nitrogen, other inert gases are also suitable. High side pressure gauge 148 tees off hose 144 and indicates pressure within purging gas supply 142. Low side pressure gauge 150 tees off hose 136 to indicate pressure available to station 90. System pressure gauge 152 indicates pressure within coolant measurement container 112.

Placement of a vacuum is controlled by vacuum control valve 154 which has two positions: MEASUREMENT CONTAINER and NEW COOLANT CONTAINER. The MEASUREMENT CONTAINER position of vacuum control valve 154 opens a path from vacuum pump relief solenoid valve 156 to coolant measurement container 112 through hoses 157 and 158. The NEW COOLANT CONTAINER position of vacuum control valve 154 opens a path from vacuum pump relief solenoid valve 156 to new coolant container 110 through hoses 157 and 160.

Vacuum pump 162 and vacuum pump relief solenoid valve 156 are controlled by vacuum pump switch 163. When vacuum pump 162 is on, vacuum pump relief solenoid valve 156 opens a path from vacuum pump 162 to vacuum valve 154. When vacuum pump 162 is off, vacuum pump relief solenoid valve 162 holds a vacuum while allowing vacuum pump 162 to vent to atmospheric pressure. An advantage is thereby provided of relieving negative pressure which may cause damage to vacuum pump 162 when it is not operating.

In the described embodiment, new coolant container 110 and purged coolant container 122 can store up to five gallons of coolant each. New coolant container 110 is a closed container which stores new coolant at a pressure indicated by new coolant container pressure gauge 164. New coolant container 110 may be vented to atmospheric pressure through pressure relief valve 166 which connects to purged coolant container 122 through hoses 168 and 169. Once vented, new coolant may be added through a fill opening by removing cap 170. Whether new coolant should be added is determined by looking through sight glass 172. Purged coolant container 122 is vented to atmospheric pressure at all times through vent 174 and is drained through drain tube 176 by opening drain valve 178. Alternatively, purged coolant can be poured out through an opening by removing cap 180.

Electrical power to station 90 is controlled by ON/OFF main power switch 182 located in control panel 108. When power cord 184 is plugged into a standard 110 Vac outlet and main power switch 182 is ON, 110 Vac power is supplied to 12 Vdc power supply 186, auxiliary power outlet 188 and to vacuum pump relief solenoid valve 156 and vacuum pump 162 as controlled by vacuum pump switch 163.

12 Vdc power to fan and pump controller 189 is controlled by fan and pump timer switch 190 which has three positions: DRAIN, FILL and OFF. Fan and pump controller 89 is a timing device which one skilled in the art can readily design to accomplish the function described later herein. When station 90 is in operation, condenser fan power cord 192 and coolant pump power cord 194 are connected to condenser fan electrical connector 34 and coolant pump electrical connector 28, respectively. Accordingly, when timer switch 190 is in the DRAIN position or the FILL position, station 90 and battery cooling system 10 are electrically connected.

Having described the various components of an embodiment of the invention and their interconnections, the various modes of operation will now be described with specific reference to FIGS. 6 and 7.

DRAINING BATTERY COOLING SYSTEM

Before coupling battery coolant drain and fill station 90 to battery cooling system 10, purging gas main supply valve 146 is adjusted to provide a minimum pressure, approximately 250 psi, at regulator 132 as indicated by high side pressure gauge 148. Next, power cord 184 is plugged in and main power switch 182 is turned to the ON position.

Station 90 is electrically coupled to battery cooling system 10 for draining coolant by connecting condenser fan power cord 192 and coolant pump power cord 194 to condenser fan connector 34 and coolant pump connector 28 respectively. Next, station 90 is fluidly coupled to battery cooling system 10 by connecting drain hose 120 to drain port 40 located on the bottom of expansion tank 36 and purging gas delivery hose 134 to fill port 38 located on the top of expansion tank 36.

Once station 90 is both electrically and fluidly coupled to battery cooling system 10, battery cooling system 10 is pressurized to facilitate purging of coolant by adjusting regulator 132 until a preselected pressure, 5 psi for example, is indicated on low side pressure gauge 150. With battery cooling system 10 pressurized, drain control valve 106 and purging gas control valve 130 are each turned to their respective DRAIN positions. Next, fan and pump timer switch 190 is placed in the DRAIN position to activate fan and pump controller 189. Fan and pump controller 189 cycles condenser fan 32 and coolant pump 26 on and off according to a predetermined timing sequence to assist in purging the coolant from battery cooling system 10. For example, in the described embodiment, condenser fan 32 and coolant pump 26 are cycled on and off at 40 second intervals during the draining process.

A sample of coolant being drained from battery cooling system 10 can be obtained by opening coolant sampling valve 126 while coolant pump 26 is operating to fill container 128. An advantage is thereby provided of preserving purged coolant for immediate or future evaluation.

Once the coolant is drained from battery cooling system 10, fan and pump timer switch 190, purging gas control valve 130 and drain control valve 106 are turned OFF. Station 90 is fluidly decoupled from battery cooling system 10 by disconnecting drain hose 120 from drain port 40 and purging gas delivery hose 134 from fill port 38. Then condenser power cord 192 and coolant pump power cord 194 are disconnected from their respective connectors. Main power switch 182 is turned OFF. Finally, purging gas main supply valve 146 is closed and the station may be unplugged. This completes the drain process description.

ADDING AND OUTGASSING NEW COOLANT

Figure 6:
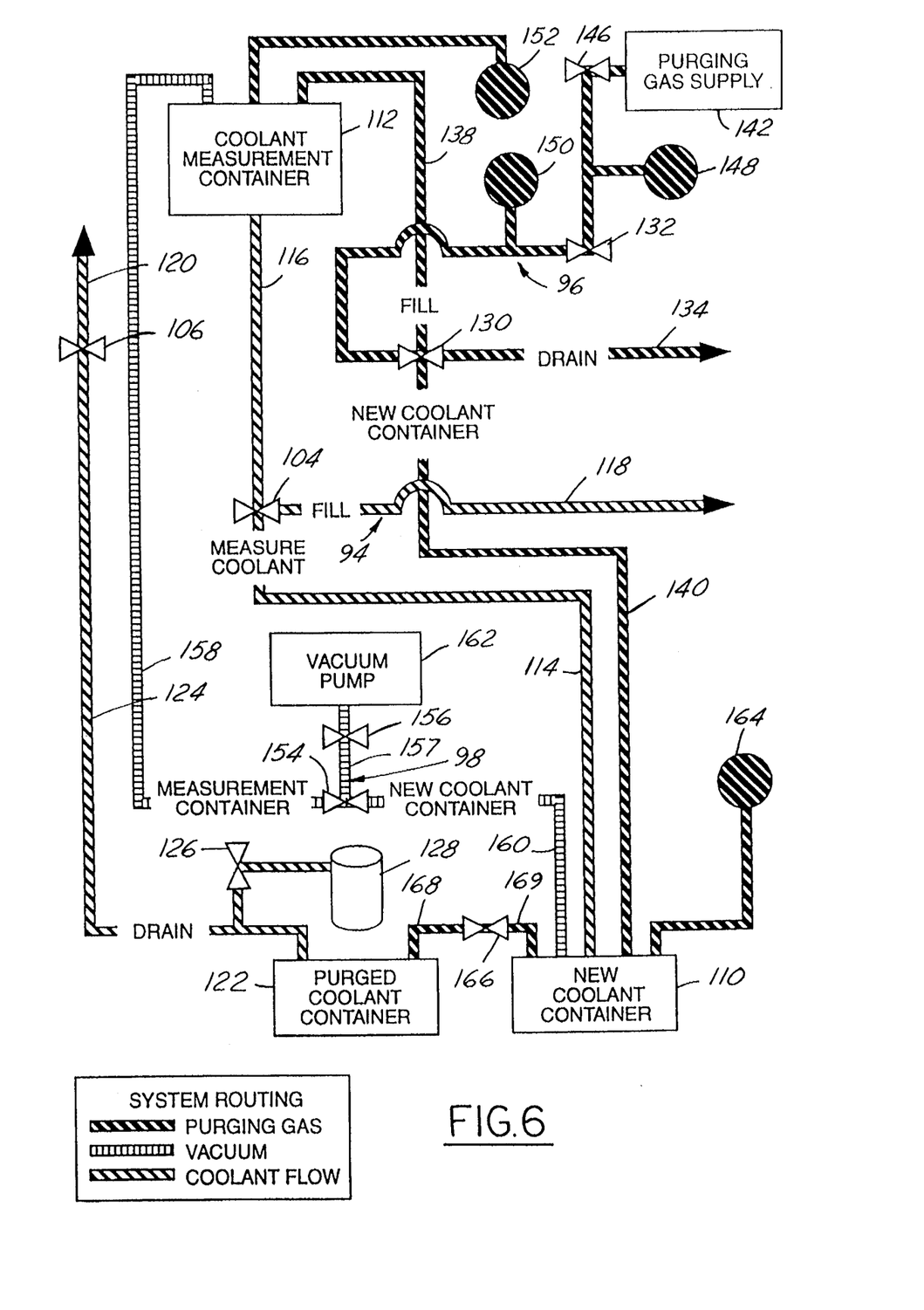
FIG. 6 is a schematic representation of a portion of the embodiment shown in FIG. 2.
Figure 7:
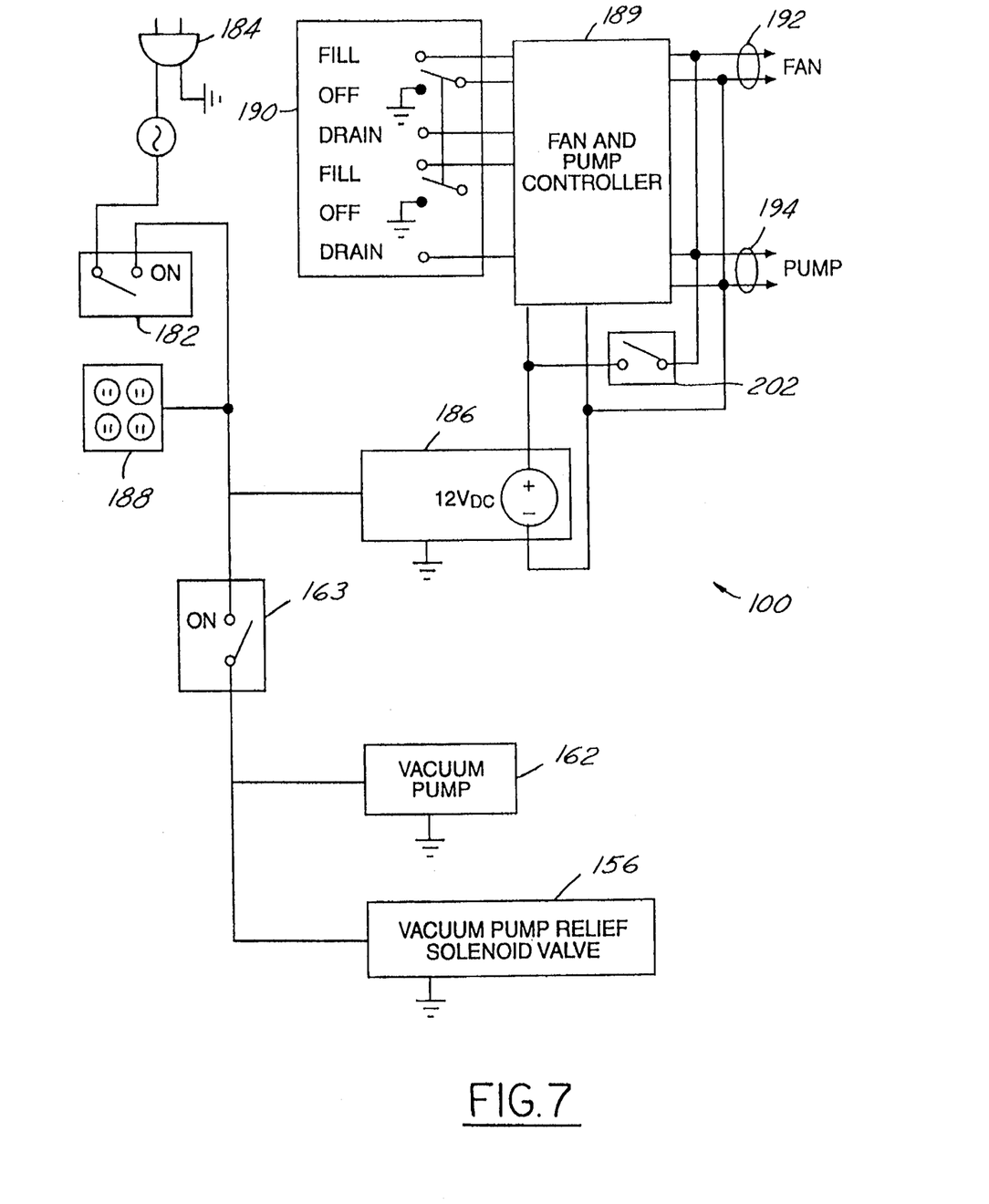
FIG. 7 is a schematic representation of a portion of the embodiment shown in FIG. 2.

Continuing with FIGS. 2–7, and in particular FIGS. 6 and 7, the coolant level in new coolant container 110 may be checked by viewing through sight glass 172. When there is insufficient coolant remaining in new coolant container 110 to fill battery cooling system 10, new coolant must be added to the station before filling battery cooling system 10.

Before removing cap 170 which seals a fill opening, new coolant container 110 should be vented to atmospheric pressure by opening pressure relief valve 166 until pressure gauge 164 indicates zero. Once coolant has been added to new coolant container 110 through the fill opening, pressure relief valve 166 is closed and cap 170 is returned to seal the fill opening.

To reduce the risk of oxygen contamination in battery cooling system 10, absorbed oxygen in new coolant added to station 90 must be outgassed. A path for drawing a vacuum in new coolant container 110 to outgas the new coolant is opened by turning vacuum control valve 154 to the NEW COOLANT POSITION. Main power switch 182 and vacuum pump switch 163 are then turned ON until a vacuum of at least thirty inches of mercury is present in new coolant container 110 as indicated on pressure gauge 164. The vacuum continues to be drawn until the coolant is completely outgassed. An advantage of preventing oxygen contamination of battery cooling system 10 is thereby obtained by outgassing the new coolant. Another advantage obtained in drawing a vacuum in new coolant container 110 is that leaks in new coolant container 110 are detectable. If pressure does not drop below zero while vacuum pump 162 is running or the vacuum is not held after vacuum pump switch 163 is turned OFF, a leak is present.

Once the new coolant is outgassed of absorbed oxygen and new coolant container 110 has been tested for leaks, purging gas is introduced into new coolant container 110 to maintain positive pressure. This positive pressure is obtained by opening the purging gas main supply valve 146, adjusting regulator 132 until low side pressure gauge 150 indicates a minimum pressure of 5 psi, and then turning purging gas control valve 130 to the NEW COOLANT CONTAINER position. Once the pressure in new coolant container 110 indicated by pressure gauge 164 reaches 5 psi, purging gas control valve 130 is turned to the OFF position and regulator 132 is closed.

After adding new coolant and repressurizing new coolant container 110, vacuum control valve 154 is returned to the MEASUREMENT CONTAINER position and main power switch 182 is turned OFF. This completes the adding and outgassing of new coolant.

EVACUATING BATTERY COOLING SYSTEM

To protect battery cooling system 10 from oxygen contamination, battery cooling system 10 is evacuated prior to filling with new coolant. Vacuum system 98 (shown in FIG. 6) creates the vacuum necessary in the evacuation process.

Referring again to FIGS. 6 and 7, evacuation begins once station 90 is plugged in and main power switch 182 is turned ON. Purging gas main supply valve 146 is adjusted until a minimum pressure at regulator 132 of approximately 250 psi is indicated by high side pressure gauge 148.

Station 90 is electrically coupled to battery cooling system 10 for filling with new coolant by connecting condenser power cord 192 and coolant pump power cord 194 to condenser fan connector 34 and coolant pump connector 28 respectively. Next, station 90 is fluidly coupled to battery cooling system 10 by connecting drain hose 120 to drain port 40 located on the bottom of expansion tank 36 and coolant delivery hose 118 to fill port 38 located on the top of expansion tank 36.

A path for drawing a vacuum in battery cooling system 10 is opened by placing coolant control valve 104 in the FILL position. The vacuum is then drawn by switching vacuum pump switch 163 to the ON position.

The strength of the vacuum drawn is indicated by system pressure gauge 152. If system pressure gauge 152 indicates a vacuum of at least thirty inches of mercury is not being held after vacuum pump switch 163 is turned OFF, there is a leak in the path. Therefore, an additional advantage of evacuating battery cooling system 10 is that leaks in the system may be detected.

FILLING BATTERY COOLING SYSTEM

Once battery cooling system 10 is evacuated of oxygen, new coolant is measured for filling. Continuing with particular reference to FIG. 6, a positive pressure of purging gas in new coolant container 110 is obtained by adjusting regulator 132 until a predetermined pressure, such as 5 psi, is indicated by low side pressure gauge 150. Then purging gas control valve 130 is placed in the NEW COOLANT TANK position.

New coolant can then be transferred from new coolant container 110 to coolant measurement container 112 by opening coolant control valve 104 to the MEASURE COOLANT position. After an amount of coolant necessary to fill battery cooling system 10 has been transferred, coolant control valve 104 is turned to the OFF position. The amount necessary to fill battery cooling system 10 will vary with each system depending on the volume to be filled. For example, in the present embodiment, coolant is transferred until sight glass 198 of coolant measurement container 112 reaches fill line 200. Once fill line 200 is reached, a predetermined amount, approximately one gallon in this example, of new coolant has been transferred from new coolant container 110 to measurement container 112. As described below, if all of the new coolant transferred is not required to fill battery cooling system 10, excess coolant is returned to new coolant container 110 for future use.

Coolant measurement container 112 is next pressurized by turning purging gas control valve 130 to the FILL position and adjusting regulator 132 to increase pressure indicated by low side pressure gauge 150. In the described embodiment, this pressure is increased to 10 psi.

After coolant measurement container 112 is pressurized, new coolant is provided to battery cooling system 10 by opening coolant control valve 104 to the FILL position. To assist in circulating the new coolant through battery cooling system 10, condenser fan 32 and coolant pump 26 are cycled on and off according to a predetermined timing sequence. In the present embodiment, fan and pump timer switch 190 is placed in the FILL position. During the filling operation, fan and pump controller 189 cycles condenser fan 32 and coolant pump 26 on and off at intervals of 80 seconds and 40 seconds, respectively, during the filling process.

Once battery cooling system 10 is filled, the excess new coolant in coolant measurement container 112 will stabilize. Coolant control valve 104 and fan and pump timer switch 190 are then turned to their OFF positions. New coolant remaining in coolant measurement container 112 is returned to new coolant container 110 by opening coolant control valve 104 to the MEASURE COOLANT position. This completes the filling process.

PRESSURIZING BATTERY COOLING SYSTEM

After filling, battery cooling system 10 is repressurized by pressurizing system 96 (shown in FIG. 6) to allow for normal system operation. Continuing with particular reference to FIG. 6, the pressurizing process begins by turning coolant control valve 104 to the FILL position and adjusting regulator 132 to pressurize battery cooling system 10 and set system coolant level. In the described embodiment, system pressure is increased until the pressure indicated by low side pressure gauge 150 is 20 psi. Drain control valve 106 is placed in the DRAIN position to allow the increased pressure in battery cooling system 10 to force excess coolant out of expansion tank 36 through drain hose 120. Some purging gas remains in the battery cooling system to facilitate expansion during normal system operation.

Once the excess coolant in battery cooling system 10 is purged, drain control valve 106 is turned OFF. After system pressure gauge 152 has stabilized, coolant control valve 104 and purging gas control valve 130 are each turned to the OFF position. This completes the pressurizing of battery cooling system 10.

RAPID COOLING OF BATTERY COOLING SYSTEM

Occasionally it is desirable to rapidly cool battery cooling system 10. For example, rapid cooling is desirable when the battery 12 is overheating. Rapid cooling of battery 12 is also desirable to allow for quicker servicing of the battery cooling system.

Continuing with FIGS. 2–7, rapid cooling is achieved by providing continuous cooling and pumping by condenser fan 32 and coolant pump 26. In the present embodiment, rapid cooling switch 202 (shown in FIGS. 4 and 7) is included to bypass the fan and pump control timing circuitry and provide a direct electrical connection between station 90 and battery cooling system 10. Accordingly, when rapid cooling switch 202 is switched to the ON position, continuous cooling and pumping by condenser fan 32 and coolant pump 26 is provided. An advantage is thereby provided of rapidly cooling the battery for removal or servicing.

This concludes the description of an embodiment of the invention and its various modes of operation. The reading of it by those skilled in the art will bring to mind many alterations and modifications without departing from the spirit and scope of the invention. For example, in a more portable embodiment of the invention, 12 Vdc power supply 186 is eliminated by powering the fan and pump control circuitry with an auxiliary battery, such as a common 12 Vdc car battery. Portability can also be improved by combining coolant measurement container 112 and new coolant container 110 into a single multipurpose container. It is also not necessary to house all of the components in a cabinet. For example, the purging gas supply can be separately attached.

The various configurations in which the present invention may be used to advantage are too numerous to describe. Accordingly, it is intended that the scope of the invention be limited to only the following claims.

What is claimed:

1. An apparatus for filling and draining coolant from a battery cooling system in a vehicle, said apparatus comprising:

a coolant delivery system fluidly coupled to the battery cooling system providing new coolant to the battery cooling system when filling the battery cooling system and purging coolant from the battery cooling system when draining the battery cooling system; said coolant delivery system including a drain control valve fluidly coupled to the battery cooling system having at least a first position controlling flow of said purged coolant, a coolant control valve fluidly coupled to the battery cooling system having at least a first position and a second position directing flow of said new coolant, a first coolant container containing said new coolant, said first coolant container comprising a pressurized container fluidly connected to said pressurizing system, a coolant measurement container for measuring an amount of said new coolant being provided to the battery cooling system, said coolant measurement container fluidly coupled to said first coolant container when said coolant control valve is in said first position, and said coolant measurement container fluidly coupled to the battery cooling system when said coolant control valve is in said second position, and a second coolant container for receiving said purged coolant, said second coolant container fluidly coupled to the battery cooling system when said drain control valve is in said first position;

a pressurizing system fluidly coupled to the battery cooling system, said pressurizing system pressurizing the battery cooling system after providing said new coolant during said filling of the battery cooling system, and said pressurizing system purging coolant during said draining of the battery cooling system; said pressurizing system including a pressurized supply of purging gas, a purging gas control valve having at least a first position, a second position and a third position directing flow of said purging gas from said supply, said supply fluidly coupled to said first coolant container when said purging gas control valve is in said first position, said supply fluidly coupled to said coolant measurement container when said purging gas control valve is in said second position, and said supply fluidly coupled to the battery cooling system when said purging gas control valve is in said third position; and a vacuum system fluidly coupled to said coolant delivery system creating a vacuum.

2. An apparatus according to claim 1 wherein said pressurizing system further comprises:

a regulator interposed between said supply and said purging gas control valve;

a first pressure gauge interposed between said supply and said regulator; and a second pressure gauge interposed between said regulator and said purging gas control valve.

3. An apparatus according to claim 1 wherein said vacuum system comprises:

a vacuum control valve having a first position and a second position directing placement of a vacuum; and a vacuum pump fluidly coupled to said first coolant container when said vacuum control valve is in said first position, and said vacuum pump fluidly coupled to said coolant measurement container when said vacuum control valve is in said second position.

4. An apparatus according to claim 3 wherein said vacuum system further comprises a vacuum pump relief solenoid valve interposed between said vacuum control valve and said vacuum pump.

5. An apparatus according to claim 1 further comprising a controller electrically connected to a condenser fan and a coolant pump coupled to the battery cooling system for cycling the condenser fan and the coolant pump on and off at predetermined intervals during said filling and said draining.

6. A method for filling and draining coolant from a battery cooling system in a vehicle, said method comprising the steps of:

outgassing a supply of new coolant;

providing said new outgassed coolant to the battery cooling system when filling the battery cooling system;

purging coolant from the battery cooling system when draining the battery cooling system; and pressurizing the battery cooling system after said step of providing new outgassed coolant during said filling.

7. A method according to claim 6 wherein said step of providing new outgassed coolant to the battery cooling system comprises the steps of:

pressurizing a first coolant container with an inert purging gas;

directing flow of a predetermined amount of said new outgassed coolant out of said first coolant container into a coolant measurement container;

pressurizing said coolant measurement container; and directing flow of said predetermined amount of said new outgassed coolant into the battery cooling system.

8. A method according to claim 6 wherein said step of purging coolant from the battery cooling system comprises the steps of:

pressurizing the battery cooling system with an inert purging gas; and directing flow of said purged coolant to a second coolant container.

9. A method according to claim 6 further comprising the step of cycling a condenser fan and a coolant pump coupled to the battery cooling system according to a first predetermined timing sequence when filling the battery cooling system and according to a second predetermined timing sequence when draining the battery cooling system.

10. A method according to claim 6 further comprising the step of creating a vacuum in the battery cooling system prior to said step of providing new outgassed coolant to evacuate oxygen from the battery cooling system.

* * * * *